United States Patent
Byrne et al.

(10) Patent No.: US 10,452,703 B2
(45) Date of Patent: *Oct. 22, 2019

(54) USING ONTOLOGIES TO COMPREHEND REGULAR EXPRESSIONS

(71) Applicant: International Business Machines Corporation, Armonk, NY (US)

(72) Inventors: Brian P. Byrne, Austin, TX (US); Ivan M. Milman, Austin, TX (US); Martin A. Oberhofer, Bondorf (DE); Sushain Pandit, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 532 days.

This patent is subject to a terminal disclaimer.

(21) Appl. No.: 15/257,483

(22) Filed: Sep. 6, 2016

(65) Prior Publication Data

US 2016/0371370 A1    Dec. 22, 2016

Related U.S. Application Data

(63) Continuation of application No. 14/145,113, filed on Dec. 31, 2013, now Pat. No. 9,471,875.

(51) Int. Cl.
*G06F 16/30*    (2019.01)
*G06F 16/36*    (2019.01)
(Continued)

(52) U.S. Cl.
CPC .......... *G06F 16/367* (2019.01); *G06F 16/23* (2019.01); *G06F 16/24578* (2019.01);
(Continued)

(58) Field of Classification Search
CPC .............. G06F 16/367; G06F 17/2705; G06F 17/2785
See application file for complete search history.

(56) References Cited

U.S. PATENT DOCUMENTS 8,386,530 B2    2/2013 McMillen
8,433,715 B1    4/2013 Mirhaji
(Continued)

FOREIGN PATENT DOCUMENTS

JP    08063350 A    3/1996

OTHER PUBLICATIONS

Zaib et al.; "Instance-Based Ontology Matching Using Different Kinds of Formalisms", World Academy of Science, Engineering and Technology, vol. 55, Jul. 2009, pp. 163-171.
(Continued)

*Primary Examiner* — Mahesh H Dwivedi
(74) *Attorney, Agent, or Firm* — Patterson + Sheridan, LLP

(57) ABSTRACT

Ontologies are used to comprehend regular expressions, by selecting, based on a context relating to a domain of a regular expression, an ontology and an assertion base, parsing the regular expression to identify at least one fragment of the regular expression, identifying one or more assertions in the assertion base corresponding to one of the identified fragments, identifying, for each identified assertion, an associated node in the ontology, and returning, based on the associated nodes, a concept in the ontology as representing the associated fragment of the regular expression.

20 Claims, 3 Drawing Sheets

(51) Int. Cl.
  G06F 17/27    (2006.01)
  G06F 16/23    (2019.01)
  G06F 16/901   (2019.01)
  G06F 16/2457  (2019.01)
  G06F 16/903   (2019.01)
  G06N 5/04     (2006.01)
  G06N 5/02     (2006.01)

(52) U.S. Cl.
  CPC .... *G06F 16/9017* (2019.01); *G06F 16/90344* (2019.01); *G06F 17/2705* (2013.01); *G06F 17/2785* (2013.01); *G06N 5/022* (2013.01); *G06N 5/04* (2013.01)

(56) References Cited

U.S. PATENT DOCUMENTS

| | | | |
|---|---|---|---|
| 2007/0050343 | A1  | 3/2007  | Siddarammappa et al. |
| 2007/0265833 | A1* | 11/2007 | Nakayama ............ G06F 17/218 704/10 |
| 2009/0070328 | A1* | 3/2009  | Loeser ................ G06F 16/3329 |
| 2009/0112841 | A1* | 4/2009  | Devarakonda ......... G06F 16/36 |
| 2011/0213823 | A1  | 9/2011  | Schmidt |
| 2012/0005184 | A1  | 1/2012  | Thilagar et al. |
| 2012/0102456 | A1  | 4/2012  | Paulheim et al. |
| 2012/0124064 | A1  | 5/2012  | Syrowitz et al. |
| 2012/0143881 | A1  | 6/2012  | Baker et al. |
| 2012/0311529 | A1  | 12/2012 | Beveridge et al. |
| 2013/0041921 | A1  | 2/2013  | Cooper et al. |
| 2013/0054285 | A1* | 2/2013  | Oberhofer ............... G06Q 10/00 705/7.11 |
| 2013/0054286 | A1  | 2/2013  | Oberhofer et al. |
| 2013/0338998 | A1* | 12/2013 | Freitas ................ G11C 13/0004 704/9 |
| 2015/0074034 | A1* | 3/2015  | Ait-Mohktar ......... G06F 16/835 706/50 |

OTHER PUBLICATIONS

LacLavik et al.; "Ontology Based Text Annotation—OnTeA", Proceedings of the 2007 Conference on, Information Modeling and Knowledge Bases XVIII, IOS Press, 2007, p. 311-315.

Joshua Flanagan blog; "Readable Regular Expressions", Oct. 7, 2006, pp. 1-8, retrieved Dec. 17, 2013, <http://blog.flimflan.com/ReadableRegularExpressions.html>.

Ontology (information science), Wikipedia, pp. 1-12, retrieved Dec. 17, 2013, <http://en.wikipedia.org/wiki/Ontology_%28information_science%29>.

Regular expression, Wikipedia, pp. 1-22, retrieved Dec. 17, 2013, <http://en.wikipedia.org/wiki/Regular_expression>.

'10031-2008—IEEE Standard for Information Technology—Portable Operating System Interface (POSIX(R)), ISO/IEC 9945, <http://standards.ieee.org/findstds/standard/1003.1-2008.html>.

The IEEE and The Open Group; "The Open Group Base Specifications Issue 7", downloaded from <http://pubs.opengroup.org/onlinepubs/9699919799/mindex.html> on Apr. 11, 2013, 2 pages.

Just Great Software Co. Ltd.; "RegexBuddy: Easily Create or Build Regular Expression Patterns with The RegexBuddy Regex Builder", downloaded from <http://www.regexbuddy.com/create.html> on Apr. 11, 2013, 2 pages.

Victor Garcia Aprea's insights on ASP.NET; "Regex Editor for Visual Studio 2010—Followers of the IHttpHandler", <http://weblogs.asp.net/vga/archive/2009/05/22/regex-editor-for-visual-studio-2010.aspx>.

IDM Computer Solutions, Inc.; "Regular Expression Builder", downloaded from <http://www.ultraedit.com/support/tutorials_power_tips/ultraedit/regular_expression_builder_html> on Apr. 11, 2013, 3 pages.

U.S. Appl. No. 14/145,113 entitled "Using Ontologies to Comprehend Regular Expressions" filed Dec. 31, 2013.

Takashi Yoshikawa, Recovering Traceability Links between a NL Document and a Source Code by Using Domain Ontologies; Information Processing Society of Japan Technical Reports; Mar. 18, 2009; vol. 2009/No. 31; pp. 129-136.

International Search Report w/Written Opinion for PCT Application No. JP2014/005287, dated Jan. 20, 2015.

LacLavik et al.; "Ontology Based Text Annotation—OnTeA", Conference: Information Modelling and Knowledge Bases XVIII, 16th European-Japanese Conference on Information Modelling and Knowledge Bases, Jun. 2006, 6 pages.

IEEE Standards Association, 1003.1-2008—IEEE Standard for Information Technology—Portable Operating System Interface (POSIX(R)), ISO/IEC 9945, downloaded from <http://standards.ieee.org/findstds/standard/1003.1-2008.html>on May 26, 2016, 1 page.

\* cited by examiner

USING ONTOLOGIES TO COMPREHEND REGULAR EXPRESSIONS

CROSS-REFERENCE TO RELATED APPLICATIONS

This application is a continuation of co-pending U.S. patent application Ser. No. 14/145,113, filed Dec. 31, 2013. The aforementioned related patent application is herein incorporated by reference in its entirety.

BACKGROUND

The present disclosure relates to computer software, and more specifically, to computer software which uses ontologies to comprehend regular expressions. A regular expression (regex) is an expression that specifies a set of rules for identifying strings that satisfy the expression. One challenge for computer users is how to understand what kind of pattern a regex is meant to identify. Also, users may wish to tweak an existing regex to determine why certain expected strings are being matched or are not being matched against a regex. Regular expressions, however, are typically hard-coded or pre-exist in tools in a format not readily understandable to humans. As such, to transform a regex to a more human-readable form, the user must first determine what the regex means. While computers can easily process regular expressions, they are typically difficult for humans to understand.

SUMMARY

Ontologies are used to comprehend regular expressions, by selecting, based on a context relating to a domain of a regular expression, an ontology and an assertion base, parsing the regular expression to identify at least one fragment of the regular expression, identifying one or more assertions in the assertion base corresponding to one of the identified fragments, identifying, for each identified assertion, an associated node in the ontology, and returning, based on the associated nodes, a concept in the ontology as representing the associated fragment of the regular expression.

DETAILED DESCRIPTION

Embodiments disclosed herein describe techniques that provide users with detailed information about regular expressions by using ontologies and assertion bases (also referred to as knowledge bases) to determine the semantic meaning of a given regular expression. The assertion bases and ontologies may be linked together by the assertions in the assertion base. When a regular expression (regex) is supplied, a context of the regular expression may be identified, and an appropriate ontology and assertion base may be selected in response. For example, a regex for longitude and latitude may appear in a geo-coding application. Given the context of the geo-coding application, a relevant ontology and assertion base may be selected. The regex may then be broken down into smaller fragments, which are then matched to one or more assertions in the selected assertion base. Embodiments disclosed herein may then perform semantic searches on semantic or ontology-based graphs, storing intermediate and final nodes as abstract and auxiliary representations for the regex. Continuing with the geo-coding example, detailed information may be outputted indicating that the regular expression is related to the geo-coding application. For example, the output may specify that the regex is generally related to location based services and indicate that a first fragment of the regex is related to latitude, while a second fragment is related to longitude.

Stated differently, embodiments disclosed herein pair the knowledge captured in ontologies with the context in which a regular expression appears to determine higher-level abstraction and structure from fragments of a regular expression. For a regular expression provided as input, users are provided with a semantic translation of the regular expression along with meaningful examples of what the regular expression captures. Doing so improves user understanding of a regular expression. As a result, debugging regular expressions is simplified since the user need not guess the meaning of a regex. By providing a semantically annotated library of regular expressions, users are able to develop new regular expressions much faster by using the library, where regular expressions can be used as a starting point for creating new regular expressions.

Figure 1:
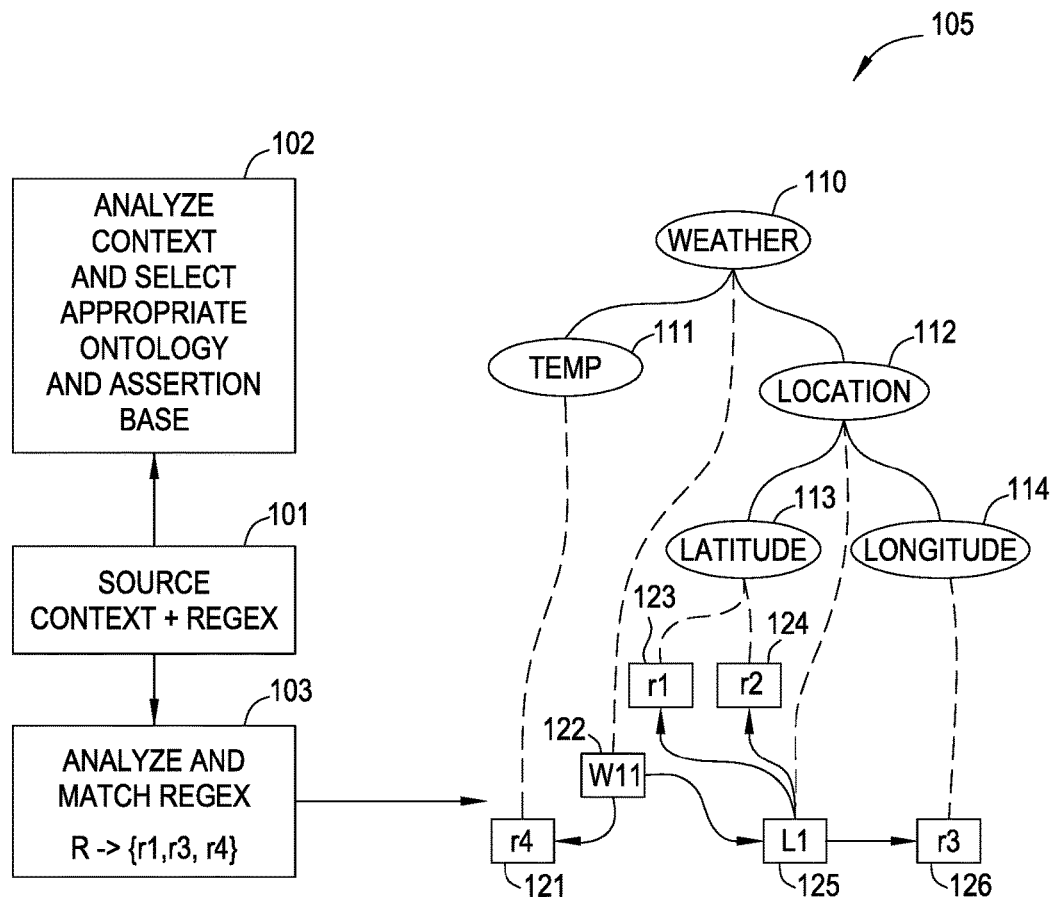
FIG. 1 illustrates techniques to use ontologies to understand regular expressions, according to one embodiment.

FIG. 1 is a schematic 100 illustrating techniques to use ontologies to understand regular expressions, according to one embodiment. As shown, at box 101, a user (or an application) specifies one or more regular expressions and a context of the regular expressions. Any regular expression may be provided, and may include several constituent parts. For example, the regular expression R may include elements r1, r3, and r4, which unknown to most users, represent latitude, longitude, and temperature, respectively. In this example, r1 and r3 may be "^(\-?\d+(\.\d+)?),\s*(\-?\d+(\.\d+)?)$" while r4 may be "(?!\d+(?:[.,]\d+)?!\bdeg\b\b[CF]\b|>)". The regular expression may be provided by a user or an application, while the context may be explicitly defined or inferred based on the tool or application using the regular expression. For example, if the regular expression is used by an application that ensures data quality in a database, the fields and tables of the database may be used to provide insight as to the context of the regular expression. The database field or table may have metadata associated with it, or could be linked to a term in a business glossary defining a specific term. If the metadata or business glossary term indicate, for example, that the field is related to a GPS coordinate, embodiments disclosed herein may infer that the context of the regular expression is geography or global positioning system (GPS) related. Generally, the context may be inferred from any source, such as a script, application, application source code, a database, an ontology, and the like.

At box 102, the system analyzes the context of the regular expression and selects an appropriate ontology and assertion base. Continuing with the geography location example, the system may select an ontology and assertion base related to geo-coding that includes concepts linked to a geographical location. At box 103, the regular expression is analyzed and matched to assertions in the assertion base 104. To do so, the regular expression is broken down into fragments by parsing the regular expression. Some techniques include identifying an "open" parenthesis, pushing the parenthesis and all following characters into a stack until the "close" parenthesis is met. The stack may then be popped—if the stack is empty, the characters popped from the buffer are identified as a separate regex.

The assertion base 104 includes a plurality of assertions, which in this example, include assertions 121-126. Each of the assertions includes a text description of a regular expression fragment and a mapping to concepts in the ontology 105. For example, r1 123 in the assertion base may map to a latitude concept in the ontology 105. The description of the assertion r1 123 may indicate that r1 is a regular expression pattern used to identify latitude. Any description may be provided for each assertion, such as "r3 126 is a regular expression pattern to identify temperature," "L1 125 is a label for a possible location," and "W11 122 is a label for a possible weather concept." The assertions in the assertion base 104 may be populated and maintained by a data steward, or may be auto-harnessed by searching the Internet. For example, an Internet search may reveal that r1 123 and r2 124 both relate to GPS coordinates, and the information in the assertion base may be populated accordingly.

Once the system matches the fragments of the regular expression to the assertions in the assertion base 104, the system identifies the corresponding fine-grained regex nodes (r1, r3, and r4 in this example) and identifies incoming edges to these nodes in order to walk a graph of the ontology to find possible label nodes until all paths converge to a common node. Any directional graph traversal algorithm may be used, including, without limitation, a breadth first or depth first search. Continuing with the example depicted in FIG. 1, the system may find L1 125 from r1 123 and r3 126, and W11 122 from r4 121. The system may further traverse the graph to find W11 122 from L1 125. As W11 122 is the node where all paths converge, the system may identify W11 as a final abstraction. Since W11 is a type of "weather" node, as defined in node 110 of the ontology, the system may output "Weather" as the high-level pattern identified by the regex. In addition, the system may output "Location" as an auxiliary sub-structure contained in the regex.

In some embodiments, the system may present examples of formats and/or data that are accepted or rejected by the provided regular expression. For instance, the system may present examples of a valid weather specification including valid location and temperature instances. The system may indicate whether a validation is unidirectional (i.e., has a specific ordering). For instance, latitude may be required to come before longitude even if logically speaking either can come first. Another example is regular expressions used to parse address data where the regular expressions enforce different ordering of certain tokens in an address by country. For example, in the United states, the structure of an address is:

(Optional Title) First Name (Optional Middle Name) Last Name
  House Number—(Optional Unit Number)—Street Name
  City—State—Zip Code—United States
  While in Germany, addresses are structured as:
  (Optional Title)—First Name—(Optional Middle Name)—Last Name
  Street Name—House Number—(Optional Unit Number)
  Zip Code—City
  Germany As these address formats show, the order and permissible range values vary within sub-domains of a given domain. Therefore, if in matching the regex fragments to the assertions in the assertion base, a subdomain/domain like latitude is found, any available knowledge on ordering from that domain is considered to improve the accuracy of the output generated by the system relative to the regular expression.

In still another embodiment, terms in a business glossary may be enriched by linking regular expressions to terms in the business glossary using the high-level patterns identified by the system. These regular expressions may also define key performance indicators for data quality, etc. For instance, in the above example, after determining "weather" and "location" as main and auxiliary patterns identified by the regex, the system may also search the business glossary trying to find a semantic match for the patterns. If matches are found, the system writes extra metadata (i.e., the regular expressions) to the terms or terms in the business glossary.

In some embodiments, the user may provide feedback for output generated by the system. For example, the user may indicate that the "weather" designation was accurate, but that the "location" designation was inaccurate. In such embodiments, the system may use the user feedback to assign weights to the mappings between the assertions in the assertion base 104 and the ontology 105. If the weight of a given link falls below or above a threshold, the system may refine the links by reinforcing the links whose weight is above the threshold, and removing links whose weight falls below the threshold.

Figure 2:
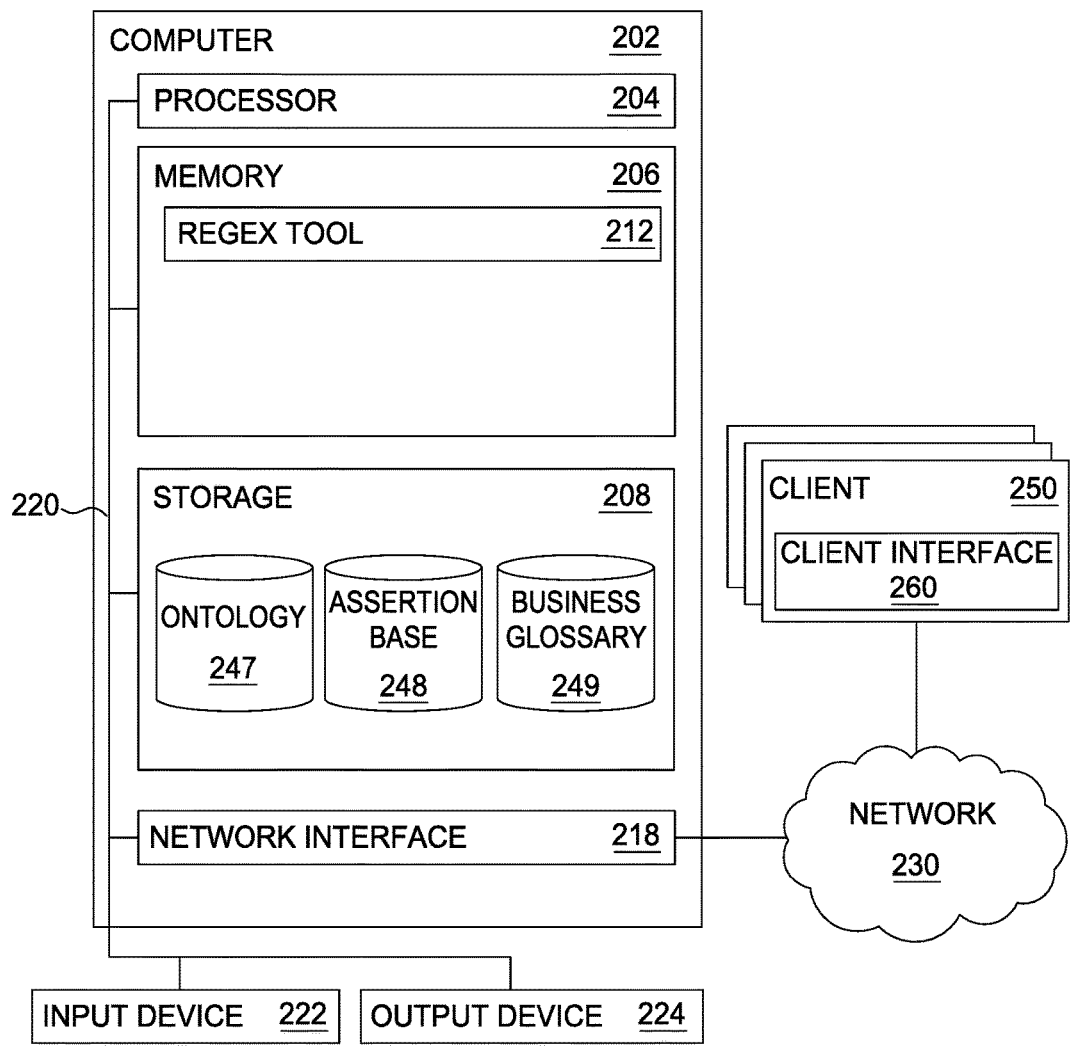
FIG. 2 illustrates a system to use ontologies to understand regular expressions, according to one embodiment.

FIG. 2 illustrates a system 200 to use ontologies to understand regular expressions, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains the regex tool 212, which is an application generally configured to provide users with detailed information about regular expressions. For a regular expression (and context) received as input, the regex tool 212 analyzes the context to select an appropriate ontology and knowledge base. For example, if the context expressly indicates that the regex is part of a geo-coding application, the regex tool 212 may select a relevant ontology and knowledge base having terms and assertions related to geo-coding. The context may be expressly defined, or the regex tool 212 may infer the context using a variety of existing data that may provide insight to the context. The regex tool 212 may then break the regex down into fragments, which may then be matched to assertions in the assertion base 248. The regex tool 212 may then identify common nodes shared by the nodes in the assertion base 248. The assertions in the assertion base 248 may be linked to concepts in one or more ontologies 247. The regex tool 212 may then identify one or more concepts in the ontology 247 as related to the regular expression based on the information in the ontology 247 related to the common nodes. The regex tool 212 may then output detailed information to the user regarding the regex.

As shown, storage 208 contains ontology 247, which provides the structural framework for organizing information. An ontology formally represents knowledge as a set of concepts within a domain, and the relationships between those concepts. Assertion bases 248 each includes a plurality of assertions related to a specific domain. Each assertion includes a text description of a regular expression fragment and a mapping to one or more concepts in the ontology 247. Business glossary 249 allows users to create and manage an enterprise vocabulary and classification system using a domain-specific collection of industry standard terms and definitions. A plurality of client computers $250_{1-N}$ may access the regex tool 212 through a client interface 260. In at least some embodiments, the regex tool 212 executes on one or more client computers $250_{1-N}$.

Figure 3:
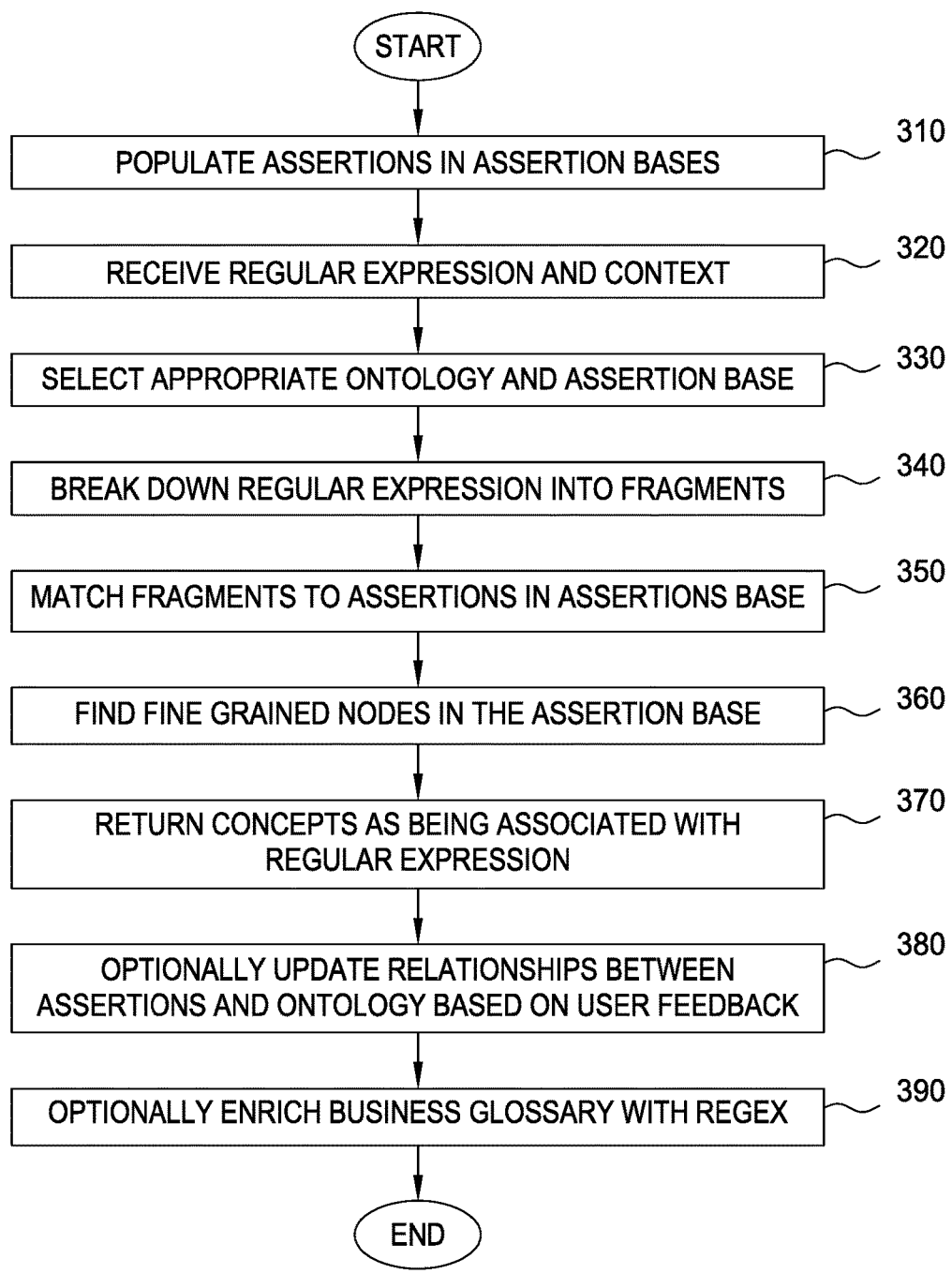
FIG. 3 illustrates a method to use ontologies to understand regular expressions, according to one embodiment.

FIG. 3 illustrates a method 300 to use ontologies to understand regular expressions, according to one embodiment. Executing the steps of the method 300 generates detailed information regarding a regular expression to a user. At step 310, assertions in one or more assertion bases 248 may be populated by a user or programmatically populated by leveraging information retrieved from the Internet. Each assertion includes a text description of a regular expression fragment and a mapping to one or more concepts in one of the ontologies. For example, an assertion may state that "R1 represents airplane models." At step 320, the regex tool 212 may receive a regular expression and a context from a user or application. At step 320, the regex tool 212 selects an appropriate ontology 247 and assertion base 248 based on an analysis of the context received at step 320. For example, if the context indicates that the regular expression may be related to aviation, the regex tool 212 may select an assertion base and ontology related to aviation. At step 340, the regex tool 212 may break down the regular expression into one or more smaller fragments using known heuristics.

At step 350, the regex tool 212 may match the fragments to assertions in the selected assertion base 248 by searching the assertions in the assertion base 248 to identify assertions describing each respective fragment of the regular expression. Once the assertions are identified, the regex tool 212 may traverse a graph of the assertions in the assertion base 248 to identify one or more nodes that are common to the identified assertions at step 360. As each of the assertions in the assertion base 248 are mapped to one or more concepts in the ontology 247, the regex tool 212 may return the mapped concepts in the ontology 247 as being associated with the regular expression at step 370. For example, the regex tool 212 may output one or more broad focuses of the regular expression, such as "aviation," and then include a detailed description of each fragment of the regular expression. At step 380, the regex tool 212 may optionally update relationships between the assertions in the assertion base 248 and the ontology 247 based on user feedback. For example, if the user indicates that the regex tool 212 returned correct information regarding the regular expression, a weight for the identified assertions may be increased indicating greater confidence in the assertions and the mappings to the ontology. If, however, the user indicates that the regex tool 212 was incorrect, the weight may be decreased. If the weight falls below a threshold, the regex tool 212 may remove the assertion from the assertion base 248. At step 390, the regex tool 212 may optionally enrich terms in the business glossary 249 with the regular expression by linking reverse engineered regular expressions to business terms using the identified high-level patterns. For instance, after identifying "aviation" and "airplanes" as main and auxiliary patterns matched by the regex, the regex tool 212 may also search the business glossary 249 trying to find a semantic match for the patterns. If matches are found, the system writes extra metadata (i.e., the regular expressions) to the terms or terms in the business glossary.

Advantageously, embodiments disclosed herein take regular expressions, which are not easily understood by human readers, and provide insight as to their meaning and utility. Users may receive automatic semantic translations of any regular expression alongside meaningful examples of what the regular expression captures. With the improved understanding of the regular expressions, users can significantly reduce debugging time, since the user no longer needs to determine what the regular expressions are intended to capture. Additionally, by providing a semantically annotated library of regular expressions, users may be able to develop new regular expressions by using the existing regular expressions as a starting point.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications such as the regex tool or related data available in the cloud. For example, the regex tool could execute on a computing system in the cloud and determine the conceptual meaning of regular expressions. In such a case, the regex tool could analyze a regular expression and store higher-level abstractions describing the regular expression at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   parsing a regular expression to identify at least one fragment of the regular expression;
   identifying one or more assertions in an assertion base corresponding to one of the identified at least one fragment;
   identifying, for each identified assertion, an associated node in an ontology, wherein the assertion base and the ontology relate to a domain of the regular expression; and
   returning, based on the associated node, a concept in the ontology as representing the identified at least one fragment of the regular expression.

2. The method of claim 1, further comprising:
   selecting the ontology and the assertion base based on a context relating to the domain of the regular expression,
   wherein the context comprises at least one of: (i) an explicit context, (ii) an implicit context derived an entry in a business glossary, and (iii) an implicit context derived from metadata associated with a database table.

3. The method of claim 1, wherein the concept in the ontology is returned upon determining the associated node points to the concept.

4. The method of claim 1, further comprising:
   receiving feedback for at least one returned concept; and
   updating a weight between the identified associated node of the at least one returned concept and the associated assertion in the assertion base based on the received feedback.

5. The method of claim 4, further comprising:
   upon determining that the weight between the at least one returned concept and the associated assertion falls below a predefined threshold, removing the association between the at least one returned concept and the associated assertion.

6. The method of claim 1, further comprising:
   identifying one or more terms in a knowledge base related to the returned concept; and
   updating metadata of each identified term in the knowledge base to include the regular expression.

7. The method of claim 1, wherein each of the one or more assertions in the assertion base are defined based on at least one of: (i) user input, and (ii) auto-retrieval of one or more existing assertions.

8. A system, comprising:
   one or more computer processors; and
   a memory containing a program which when executed by the one or more computer processors, performs an operation, the operation comprising:
      parsing a regular expression to identify at least one fragment of the regular expression;
      identifying one or more assertions in an assertion base corresponding to one of the identified at least one fragment;
      identifying, for each identified assertion, an associated node in an ontology, wherein the assertion base and the ontology relate to a domain of the regular expression; and
      returning, based on the associated nodes, a concept in the ontology as representing the identified at least one fragment of the regular expression.

9. The system of claim 8, the operation further comprising:
   selecting the ontology and the assertion base based on a context relating to the domain of the regular expression,
   wherein the context comprises at least one of: (i) an explicit context, (ii) an implicit context derived an entry in a business glossary, and (iii) an implicit context derived from metadata associated with a database table.

10. The system of claim 8, wherein the concept in the ontology is returned upon determining the associated node points to the concept.

11. The system of claim 8, the operation further comprising:
    receiving feedback for at least one returned concept; and
    updating a weight between the identified associated node of the at least one returned concept and the associated assertion in the assertion base based on the received feedback.

12. The system of claim 11, the operation further comprising:
    upon determining that the weight between the at least one returned concept and the associated assertion falls below a predefined threshold, removing the association between the at least one returned concept and the associated assertion.

13. The system of claim 8, the operation further comprising:
    identifying one or more terms in a knowledge base related to the returned concept; and
    updating metadata of each identified term in the knowledge base to include the regular expression.

14. The system of claim 8, wherein each of the one or more assertions in the assertion base are defined based on at least one of: (i) user input, and (ii) auto-retrieval of one or more existing assertions.

15. A computer program product, comprising:
    a computer-readable storage medium having computer-readable program code embodied therewith, the computer-readable program code executable by a processor to perform an operation comprising:
       parsing a regular expression to identify at least one fragment of the regular expression;
       identifying one or more assertions in an assertion base corresponding to one of the identified at least one fragment;
       identifying, for each identified assertion, an associated node in an ontology, wherein the assertion base and the ontology relate to a domain of the regular expression; and
       returning, based on the associated nodes, a concept in the ontology as representing the identified at least one fragment of the regular expression.

16. The computer program product of claim 15, the operation further comprising:
    selecting the ontology and the assertion base based on a context relating to the domain of the regular expression,
    wherein the context comprises at least one of: (i) an explicit context, (ii) an implicit context derived an entry in a business glossary, and (iii) an implicit context derived from metadata associated with a database table.

17. The computer program product of claim 15, wherein the concept in the ontology is returned upon determining the associated node points point to the concept.

18. The computer program product of claim 16, the operation further comprising:
   receiving feedback for at least one returned concept; and
   updating a weight between the identified associated node of the at least one returned concept and the associated assertion in the assertion base based on the received feedback.

19. The computer program product of claim 18, the operation further comprising:
   upon determining that the weight between the at least one returned concept and the associated assertion falls below a predefined threshold, removing the association between the at least one returned concept and the associated assertion.

20. The computer program product of claim 16, wherein each of the one or more assertions in the assertion base are defined based on at least one of: (i) user input, and (ii) auto-retrieval of one or more existing assertions, wherein the operation further comprises:
   identifying one or more terms in a knowledge base related to the returned concept; and
   updating metadata of each identified term in the knowledge base to include the regular expression.

\* \* \* \* \*